US006945464B2

(12) United States Patent
Jackson

(10) Patent No.: US 6,945,464 B2
(45) Date of Patent: Sep. 20, 2005

(54) METHOD OF ISSUING TICKETS TO EVENTS

(75) Inventor: Diane Jackson, Beverly Hills, MI (US)

(73) Assignee: Imagine Pass L.L.C., Beverly Hills, MI (US)

( * ) Notice: Subject to any disclaimer, the term of this patent is extended or adjusted under 35 U.S.C. 154(b) by 97 days.

(21) Appl. No.: 10/438,231

(22) Filed: May 14, 2003

(65) Prior Publication Data

US 2003/0213843 A1 Nov. 20, 2003

Related U.S. Application Data

(60) Provisional application No. 60/380,757, filed on May 14, 2002.

(51) Int. Cl.[7] ................................................ G06K 19/00

(52) U.S. Cl. ........................ 235/487; 235/384; 235/382

(58) Field of Search ................................ 235/382, 384, 235/487; 705/13, 14, 16, 18, 64, 77

(56) References Cited

U.S. PATENT DOCUMENTS 4,195,431 A 4/1980 Neufeld
4,557,215 A 12/1985 Peterson
5,386,933 A 2/1995 Greene et al.
5,400,936 A 3/1995 Jones et al.
5,793,030 A * 8/1998 Kelly, Jr. .................... 235/385
5,797,126 A * 8/1998 Helbling et al. ............... 705/5
5,895,075 A * 4/1999 Edwards ...................... 283/81
5,956,877 A 9/1999 Raasch et al.
5,979,941 A * 11/1999 Mosher et al. ................ 283/67
6,211,790 B1 4/2001 Radomsky et al.
6,464,136 B2 10/2002 Walsh
6,510,634 B1 * 1/2003 Riley .......................... 40/633
2001/0048027 A1 12/2001 Walsh
2003/0176681 A1 * 9/2003 Riley .......................... 40/633
2004/0060215 A1 * 4/2004 Riley .......................... 40/633
2004/0068906 A1 * 4/2004 Riley .......................... 40/633
2004/0148836 A1 * 8/2004 Riley .......................... 40/633
2004/0244251 A1 * 12/2004 Riley .......................... 40/633
2005/0040228 A1 * 2/2005 Mullins et al. ............. 235/380

FOREIGN PATENT DOCUMENTS

FR 2 669 758 A1 * 5/1992 ............. G09F/3/14

* cited by examiner

*Primary Examiner*—Karl D. Frech
(74) *Attorney, Agent, or Firm*—Howard & Howard

(57) ABSTRACT

A method of issuing a ticket 32 to an event comprising the steps of displaying on a screen 14 the event information for various different venues on a plurality of machines 10 located at various different locations that are geographically separated. The purchaser proceeds by selecting a ticket from the types of tickets displayed on a screen 14 and entering ticket purchasing information for the selected ticket. The machine 10 takes a picture 38 of the ticket purchaser using the machine 10 and a wristband-ticket 32 having first 34 and second 36 ends with the picture 38 of the ticket purchaser and a code 48 thereon and including an attachment 40, 44, 46 associated with the ends 34, 36 and under the code 48 for securely attaching the ends 34, 36 together and rendering the ends 34, 36 non-retachable and the code 48 non-readable in response to the ends 34, 36 being detached.

10 Claims, 3 Drawing Sheets

METHOD OF ISSUING TICKETS TO EVENTS

RELATED APPLICATIONS

This application claims the priority of provisional application No. 60/380,757 filed May 14, 2002.

BACKGROUND OF THE INVENTION

1. Field of the Invention

The subject invention relates to the dispensing of tickets for an event.

2. Description of the Prior Art

The most direct manner in which tickets for an event are dispensed is for the ticket purchaser to go the event, purchase a ticket and proceed to enter the event venue, e.g., a movie theater. Tickets may be reserved and held at the ticket office for the user upon attending the event. Then there is the advanced ticket sales wherein tickets are purchased and mailed to the purchaser from a central depository.

Often scalpers misuse the tickets and tickets are exchanged once in the venue to allow numerous persons to use one ticket to enter prized areas of the venue.

SUMMARY OF THE INVENTION AND ADVANTAGES

The subject invention provides a method of issuing a ticket to an event by employing a geographical system of widespread machines for printing tickets that provide enhanced security. The method utilizes a central data bank containing event data including time and seat location whereby a potential purchaser may select a desired event. Once the event is selected, a ticket is selected from the various types of tickets available and is purchased. The machine then prints a wristband-ticket having first and second ends with a code thereon and including an attachment associated with the ends and under the code for securely attaching the ends together and rendering the ends non-retachable and the code non-readable in response to the ends being detached. The wristband-ticket is placed about the wrist of the ticket user by attaching the ends together and the code is read at the event to control movement of the ticket user at the event.

The subject invention allows actual tickets to be dispensed simultaneously from multiple machines in widely separated geographical areas. In addition, it makes scalping more difficult as well as providing more security and tracking of a ticket holder as the ticket can only be used by one user, i.e., it can not be transferred among various users.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE PREFERRED EMBODIMENT

Figure 1:
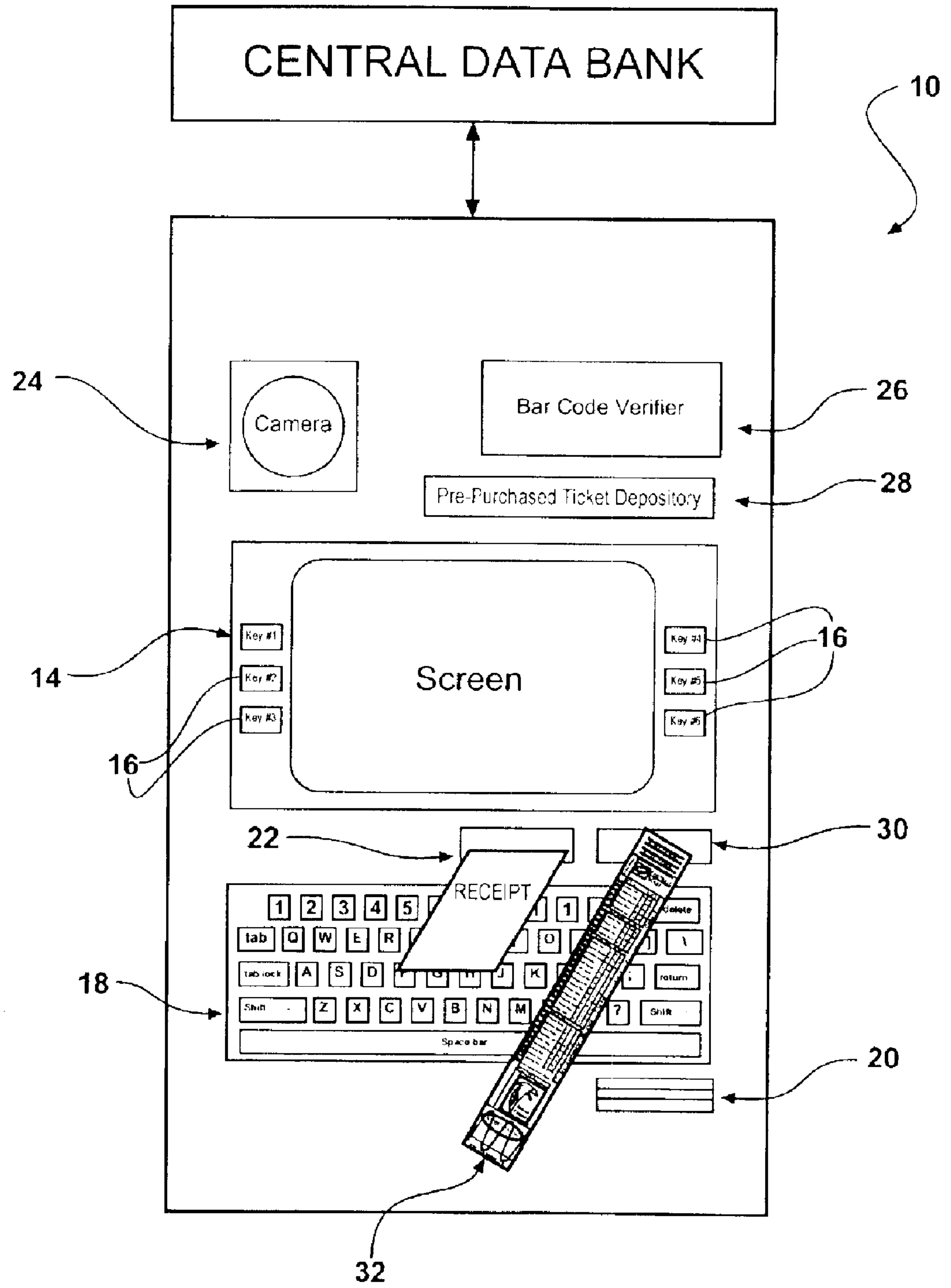
FIG. 1 is a schematic diagram of a system employed in the subject invention to process a ticket.
Figure 2:
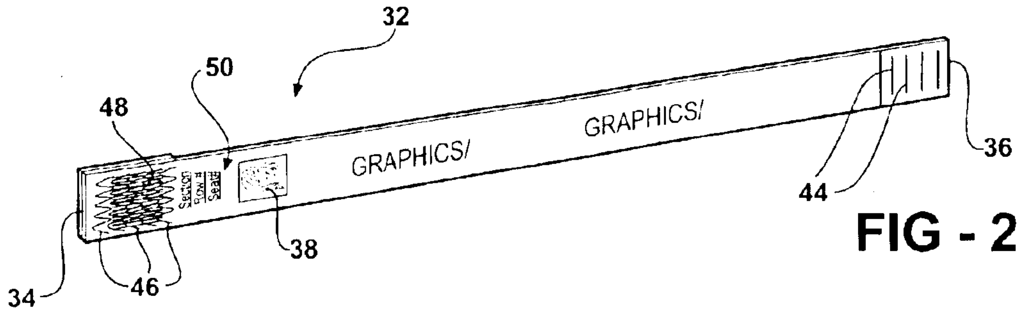
FIG. 2 is a perspective view of a wristband-ticket utilized in the subject invention.

Referring to the Figures, wherein like numerals indicate like or corresponding parts throughout the several views, a machine for issuing a ticket to an event is generally shown at 10 in FIG. 1.

The machine 10 would be positioned in convenient places where there is high pedestrian traffic, such as shopping malls, or the like. A plurality of such machines 10 are distributed throughout a wide geographical area and are all connected via phone lines, the internet, or the like, to a central data bank 12 containing event data. The data bank 12 is connected so as to simultaneously communicate with a plurality of ticket machines 10. The central data bank 12 is a compilation of information for numerous events and venues, i.e., a central ticket issuing authority for numerous different events at various different venues. The data bank 12 would include the venue, the event, the types of tickets available, e.g., by date, time, section, row, seat, etc. The basic information would be the time and seat location, the time could include the date and performance and the seat location could be general admission to a specific seat. For security purposes, the "seat" location is a generic term indicating the area within the venue to which the ticket is entitled to pass into.

In the same manner as an ATM, the machine includes a display screen 14 for displaying ticket purchasing information, i.e., the information set forth above re venue, event, etc. the screen 14 includes push buttons 16 to select options provided during the purchasing process, like selecting the venue, event, time, seat selection, etc. Furthermore, the machine 10 includes a keyboard 18 for entering ticket-purchasing information that may not be readable from a credit card reader 20. The credit card reader 20 is included for debiting the ticket purchase price to the credit card account and/or identifying the purchaser. The machine 10 also includes a receipt dispenser 22 of the type well known in the ATM art.

The machine also includes a camera 24 for taking a picture of the ticket purchaser, i.e., the person operating the machine to purchase or acquire a ticket.

In some instances, the ticket may be reserved over the internet and an eticket or pass printed at home and the eticket or pas taken to a machine 10 for obtaining the actual ticket allowing entry to the event. Accordingly, the machine 10 includes a bar code reader 26 for reading bar codes on the pass or eticket. After being read by the bar code reader 26, the pass or eticket may be deposited in the depository 28.

The machine 10 includes a printer 30 for printing a wristband-ticket 32 in the form of a strip having first 34 and second 36 ends with the picture 38 of the ticket purchaser thereon and including an attachment associated with the ends 34, 36 for securely attaching the ends together and rendering the ends non-retachable in response to being detached. The picture allows for positive identification of the ticket holder anywhere in the venue or event. The printer includes a storage unit for storing a plurality of blank wristband strips with the attachment ends and reader to receive printing for the event, venue, etc.

Figure 3:
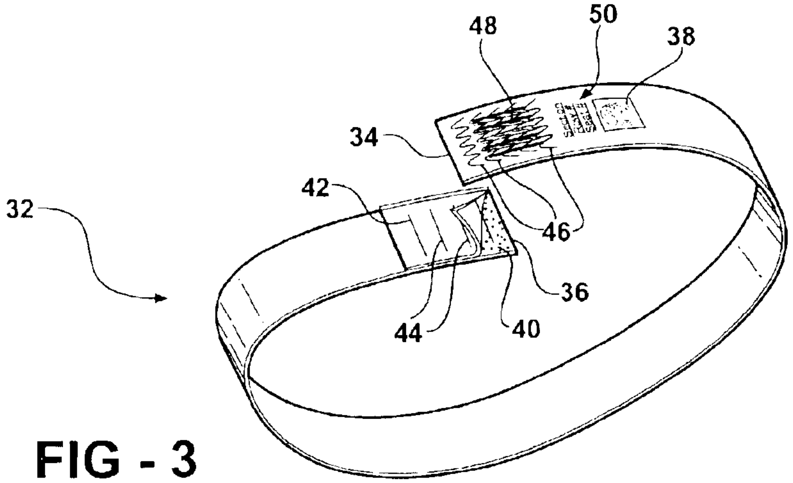
FIG. 3 is a fragmentary perspective view showing the adhesive cover being removed.
Figure 4:
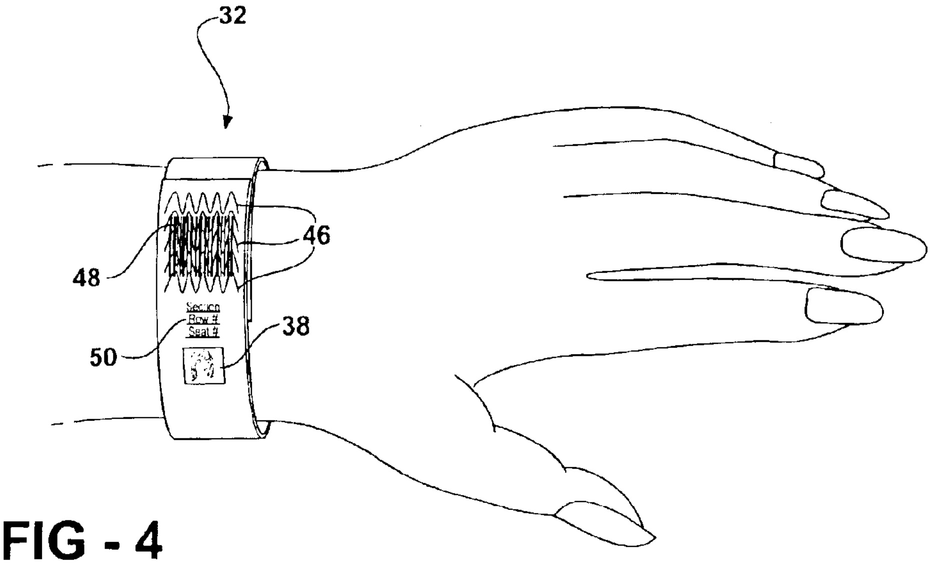
FIG. 4 is a perspective view of the wristband-ticket on the wrist of a user.

More specifically, the attachment is associated with the first and second ends 34, 36 of the strip 32, and are for securely attaching the first and second ends 34, 36 together (see FIG. 4) so that if they are detached they are not effectively reattachable, and the detachment is clearly visible to the naked human eye. The attachment preferably comprises an aggressive permanent pressure sensitive adhesive 40 (see FIG. 3) on the exterior face of the second end 34 of the strip 32 and initially covered by a release sheet 42. A plurality of security slits or lines of weakness 44 are formed in the strip 32 through the strip 32 at the second end 36 thereof where the adhesive 40 covers the strip 32. Additional slits 46 could be provided at the first end 34 where engaged by the adhesive 40. The adhesive 40 and release sheet 42, which may be transparent, may be provided by a piece of transfer tape, such as "Extra Tack" transfer tape, available from Moore Business Forms of Lake Forest, Ill. The lines of weakness 44, 46 extend in the width dimension of the strip 32 and are provided in number and extent, taking into account the aggressiveness of the adhesive 40, its adherence to the strip, so that if detachment of the ends 34, 36 is attempted once they have been adhesively secured together (as seen in FIG. 4), the strip 32 will rupture at the slits 44, 46, making effective reattachment of the band 32 ends 34, 36 with the band 32 around the wrist (as seen in FIG. 4) impossible. That is the rupture (detachment) will be clearly visible to the naked human eye. The security slits 44 and 46 can be formed either vertically or diagonally to define areas of weakness so that the wristband-ticket 32 tears in such area should attempts be made to forcefully separate the wristband 32 when adhered to itself, such as when secured to a wrist as shown in FIG. 4. The purposeful removal of the wristband 32 is accomplished by forcefully pulling on the wristband until it tears along the security slits 44, 46. Thus, a wristband 32 that either has the peel strip 42 removed, or is torn along the security slits 44, 46 is automatically invalidated and cannot thereafter be used. Attempted reuse of a wristband-ticket 32 torn along the security slits 44, 46 is visually perceptible and easily detected. This prevents persons from forcefully removing wristbands 32 from other persons and using the same in an unauthorized manner. Should a wristband 32 become inadvertently torn along the security slits 44, 46, it can be replaced on the showing of proper identification of the person.

The wristband-ticket 32 includes a bar code 48 thereon identifying the venue, event, and a locator, e.g., section, row, seat or general admission to a specific area of the venue. This information is also printed on the ticket 32 in alphabetic form as shown at 50. The bar code 48 is disposed over the security slits 44 or 46 so that the bar code 48 is not readable in the event the wristband 32 is ruptured along the security slits 44 or 46. An electrical circuit may be substituted for the bar code 48, e.g., a passive circuit that is energized and read by radio frequency signals instead of a bar code reader 26.

Figure 5:
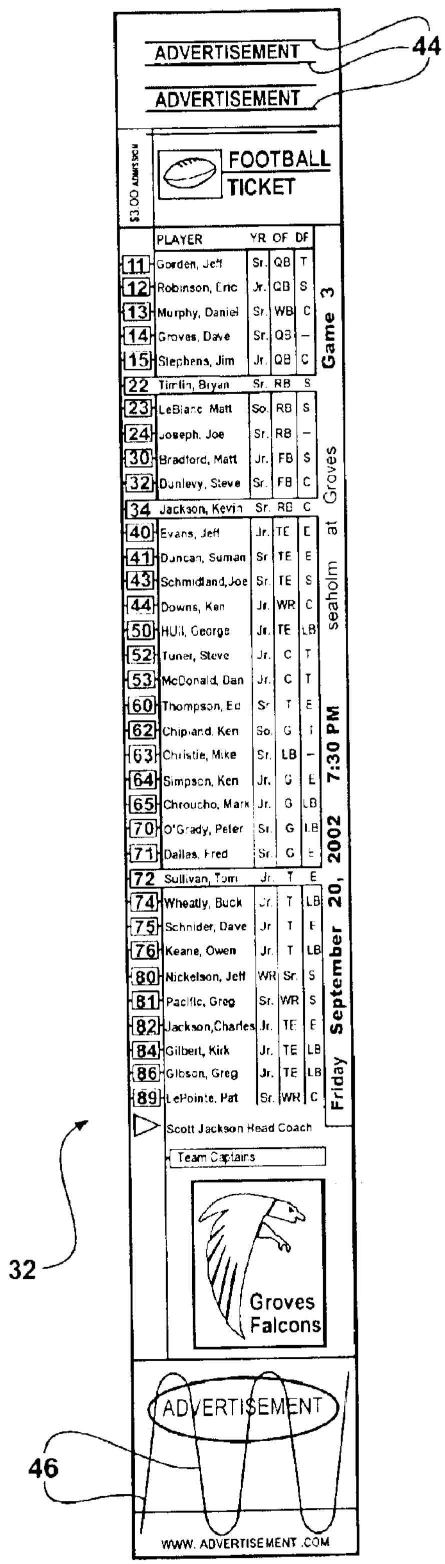
FIG. 5 is a view of one side of the wristband-ticket used for a football game.
Figure 6:
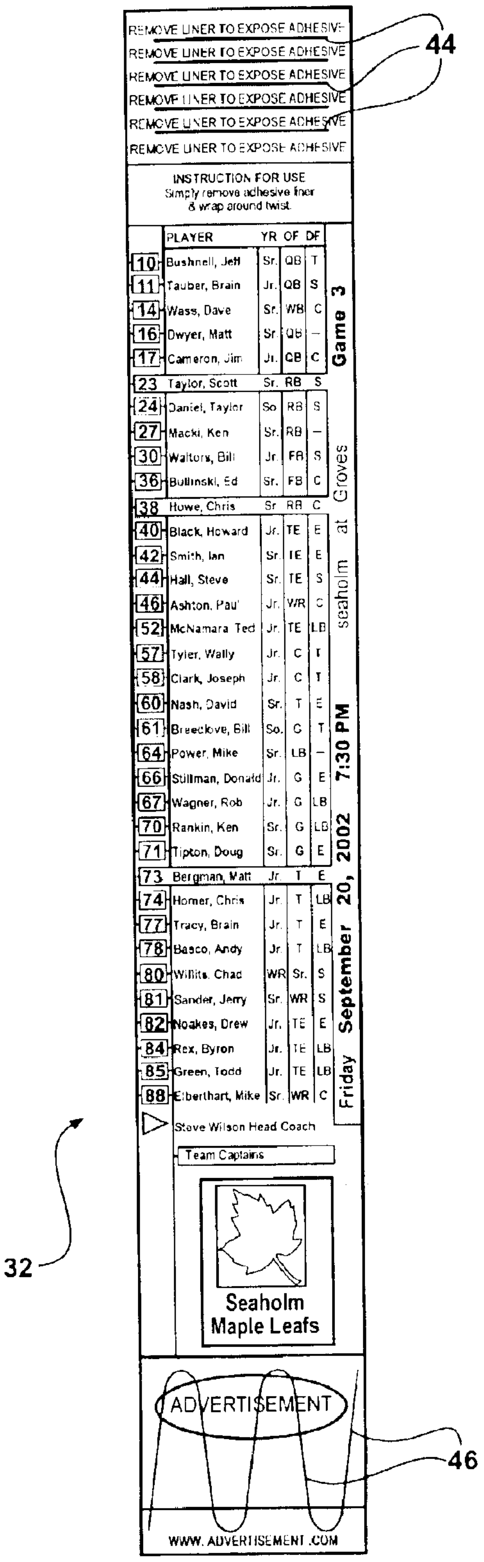
FIG. 6 is a view of the other side of the wristband-ticket of FIG. 5.

The wristband-ticket 32 may take the form of an event ticket as shown in FIGS. 5 and 6 wherein the ticket 32 is printed with information regarding the participants of the event on the wristband-ticket. As illustrated in FIGS. 5 and 6, the event is a football game and the participants are the team members. On one side (FIG. 5) of the ticket 32 the individuals members of the team are listed opposite to their respective jersey numbers and the individuals members of the opposing team are listed on the other side of the ticket opposite to their respective jersey numbers. In this case the wristband-ticket can be attached to a wrist with either of the sides facing outwardly for convenient viewing, i.e., the side of the team for whom the ticket is interested in following is exposed.

Accordingly, the invention provides a method of issuing a ticket 32 to an event comprising the steps of displaying on a screen 14 the event information for various different venues on a plurality of machines 10 located at various different locations that are geographically separated. A person may engage a machine by touching the display screen 14 and/or manipulating the keyboard 18 to select a desired event. In response, the machine 10 displays information on the screen 14 regarding various different types of tickets available at the selected event, e.g., seats available.

The purchaser proceeds by selecting a ticket from the types of tickets available and entering ticket purchasing information for the selected ticket. This selection can be by touching the screen 14 and/or operating the keyboard 18.

The method continues by debiting the ticket purchase price to a banking account through the card reader 20, which debits a bank account such as a credit card account, or any specific bank account. At the time the actual purchase is made, the machine 10 proceeds by taking a picture 38 of the ticket purchaser using the machine 10. The method of purchasing the ticket is completed by the machine 10 printing a wristband-ticket 32 having first 34 and second 36 ends with the picture 38 of the ticket purchaser and a code 48 thereon and including an attachment 40, 44, 46 associated with the ends 34, 36 and under the code 48 for securely attaching the ends 34, 36 together and rendering the ends 34, 36 non-retachable and the code 48 non-readable in response to the ends 34, 36 being detached.

To enter the venue, the wristband-ticket 32 is placed on the wrist as shown in FIG. 4 and the code 48 is read while the ticket 32 is on the wrist to control movement, including entry, of the ticket wearer at the event.

Obviously, many modifications and variations of the present invention are possible in light of the above teachings. The invention may be practiced otherwise than as specifically described within the scope of the appended claims, wherein that which is prior art is antecedent to the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the incentive novelty exercises its utility. In addition, the reference numerals in the claims are merely for convenience and are not to be read in any way as limiting.

What is claimed is:

1. A method of issuing a ticket to an event comprising the steps of;

compiling a central data bank containing event data including time and seat location, selecting a desired event, selecting a ticket from the types of tickets available, purchasing the selected ticket, printing a wristband-ticket having first and second ends with a code thereon and including an attachment associated with said ends and under the code for securely attaching the ends together and rendering the ends non-retachable and the code non-readable in response to the ends being detached, and placing the wristband-ticket about the wrist of the ticket user by attaching the ends together, and reading the code at the event to control movement of the ticket user at the event.

2. A method as set forth in claim 1 including taking a picture of the ticket purchaser and printing the wristband-ticket having the picture thereon.

3. A method as set forth in claim 2 including displaying on a screen the event information for various different venues, displaying information regarding various different types of tickets available at the selected event, entering ticket purchasing information for the selected ticket, and debiting the ticket purchase price to a banking account.

4. A method as set forth in claim 3 including issuing an eticket having a code thereon, connecting the data bank to a plurality of ticket machines, reading the code on the eticket at one of the ticket machines, and printing the wristband-ticket in response to the reading of the eticket and entering confirmation into the data bank that the wristband-ticket was printed.

5. A method as set forth in claim 1 including printing the wristband-ticket with information regarding the participants of the event on the wristband-ticket.

6. A method of issuing a ticket to an event comprising the steps of;

compiling a central data bank containing event data including time and seat location, connecting the data bank to a plurality of ticket machines, displaying on a screen the event information for various different venues, selecting a desired event, displaying information regarding various different types of tickets available at the selected event, selecting a ticket from the types of tickets available, entering ticket purchasing information for the selected ticket, debiting the ticket purchase price to a banking account, taking a picture of the ticket purchaser, and printing a wristband-ticket having first and second ends with the picture of the ticket purchaser and a code thereon and including an attachment associated with said ends and under said code for securely attaching said ends together and rendering the ends non-retachable and the code non-readable in response to the ends being detached.

7. A method as set forth in claim 6 reading the code while the ticket is on the wrist to control movement of the ticket wearer at the event.

8. A method as set forth in claim 6 including printing the wristband-ticket with information regarding the participants of the event on the wristband-ticket.

9. A machine for issuing a ticket to an event comprising;

a camera for taking a picture of the ticket purchaser, a display screen for displaying ticket purchasing information, a keyboard for entering ticket purchasing information, a bar code reader for reading bar codes, a credit card reader for debiting the ticket purchase price to the credit card account, and a printer for printing a wristband-ticket having first and second ends with the picture of the ticket purchaser and a code thereon and including an attachment associated with said ends and said code for securely attaching said ends together and rendering the ends non-retachable and the code non-readable in response to being detached.

10. A machine for issuing a ticket to an event comprising;

a display screen for displaying ticket purchasing information, a keyboard for entering ticket purchasing information, a credit card reader for debiting the ticket purchase price to the credit card account, and a printer for printing a wristband-ticket having first and second ends with a code thereon and including an attachment associated with said ends and said code for securely attaching said ends together and rendering the ends non-retachable and the code non-readable in response to being detached.

* * * * *